United States Patent
Ma et al.

(10) Patent No.: US 7,650,445 B2
(45) Date of Patent: Jan. 19, 2010

(54) SYSTEM AND METHOD FOR ENABLING A MOBILE DEVICE AS A PORTABLE CHARACTER INPUT PERIPHERAL DEVICE

(75) Inventors: Changxue Ma, Barrington, IL (US); Wei Lin, Lake Zurich, TX (US); Li-Xin Zhen, Shanghai (CN)

(73) Assignee: Motorola, Inc., Schaumburg, IL (US)

( * ) Notice: Subject to any disclaimer, the term of this patent is extended or adjusted under 35 U.S.C. 154(b) by 82 days.

(21) Appl. No.: 11/853,912

(22) Filed: Sep. 12, 2007

(65) Prior Publication Data

US 2009/0066541 A1 Mar. 12, 2009

(51) Int. Cl.
*G06F 13/12* (2006.01)
*G06F 13/00* (2006.01)

(52) U.S. Cl. .......................... 710/72; 710/300; 710/14; 382/181; 455/556.2

(58) Field of Classification Search ............... 710/8–14, 710/72–74, 300–304; 382/181; 455/556.1, 455/556.2
See application file for complete search history.

(56) References Cited

U.S. PATENT DOCUMENTS

| | | | | |
|---|---|---|---|---|
| 6,005,973 | A * | 12/1999 | Seybold et al. | 382/187 |
| 6,101,562 | A * | 8/2000 | Chang et al. | 710/73 |
| 6,427,078 | B1 * | 7/2002 | Wilska et al. | 455/550.1 |
| 6,640,113 | B1 * | 10/2003 | Shim et al. | 455/566 |
| 6,751,605 | B2 * | 6/2004 | Gunji et al. | 707/1 |
| 6,763,373 | B2 | 7/2004 | Shiigi | |
| 6,809,724 | B1 * | 10/2004 | Shiraishi et al. | 345/169 |
| 6,931,153 | B2 * | 8/2005 | Nakao et al. | 382/188 |
| 6,954,356 | B1 * | 10/2005 | Lam | 361/683 |
| 7,007,233 | B1 * | 2/2006 | Iwayama | 715/258 |
| 7,280,695 | B2 * | 10/2007 | Leung et al. | 382/187 |
| 7,305,249 | B2 * | 12/2007 | Lo | 455/550.1 |
| 7,305,434 | B2 * | 12/2007 | Notsu | 709/203 |
| 2001/0028742 | A1 * | 10/2001 | Gunji et al. | 382/229 |
| 2002/0075300 | A1 | 6/2002 | Tang et al. | |
| 2002/0169892 | A1 * | 11/2002 | Miyaoku et al. | 709/246 |
| 2003/0016873 | A1 * | 1/2003 | Nagel et al. | 382/228 |
| 2004/0012558 | A1 * | 1/2004 | Kisuki et al. | 345/156 |
| 2004/0268005 | A1 * | 12/2004 | Dickie | 710/303 |
| 2005/0165795 | A1 * | 7/2005 | Myka et al. | 707/100 |
| 2007/0189613 | A1 * | 8/2007 | Tanaka | 382/229 |
| 2007/0250653 | A1 * | 10/2007 | Jones | 710/303 |

* cited by examiner

OTHER PUBLICATIONS

Fingersystem U.S.A., "i-pen Mouse," http://www.fingersystemusa.com/products/i-pen_mouse, Downloaded Feb. 17, 2009, 3 pages.

*Primary Examiner*—Christopher B Shin
(74) *Attorney, Agent, or Firm*—Dillon & Yudell LLP

(57) ABSTRACT

A portable electronic communication device, designed for voice and data communication is utilized as a peripheral input device for transmitting/providing character inputs, entered in the first device's touch input mechanism, to a second electronic device. The first device has a mode switching utility that switches the first device between a first standard communication mode and a second peripheral input device mode. When the first device is in the second peripheral input device mode, the first device operates as a peripheral input device for the second device. A character input recognition utility executes on the first device to provide the functions of: detecting an input on the touch screen input mechanism; generating an electronic representation of the input; establishing a communication link between the second communication transmitter and an identified second device; and forwarding the electronic representation of the character input to the communication transmitter for transmission to the identified second device.

22 Claims, 9 Drawing Sheets

STEP 1
401

USER ENTERS CHRACTERS ON
TOUCHSCREEN;
CHARACTERS IDENTIFIED AND SENT VIA
WIRELESS CONNECTION TO RECEIVING
DEVICE

---

STEP 2
405

TRANSMIT DATA OVER BLUETOOH, WI-FI           (TRANSMIT DATA OVER WIRED LINK)
OR CELLULAR PROTOCOLS

---

STEP 3
407

RECEIVING DEVICE DISPLAYS CHARACTERS WITH MATCHING SELECTIONS;
USER SELECTS CORRECT CHARACTER TO INPUT INTO APPLICATION

SYSTEM AND METHOD FOR ENABLING A MOBILE DEVICE AS A PORTABLE CHARACTER INPUT PERIPHERAL DEVICE

BACKGROUND OF THE INVENTION

1. Technical Field

The present invention relates generally to electronic devices and in particular to input components for electronic devices. Still more particularly, the present invention relates to use of mobile devices as input mechanisms for electronic devices.

2. Description of the Related Art

Portable electronic devices, such as mobile (or cellular) phones, have become standard equipment used by a growing number of people throughout the world for voice communication, and more recently for text-based communication (i.e., text messaging). With the popularity of cell phones being utilized to compose text messages and also provide other (non-text) character entry, one problem that had to be overcome was that of providing full access to the complete range of language characters (textual, numeric, and others) required to convey a message in some languages. As an example, the limited space (surface area) allocated for the keypad on most mobile devices is not sufficient to include the wide range of different characters utilized in the Chinese language.

Because of the difficulty in recognizing and inputting Chinese characters, many computing devices that are utilized by Chinese speakers require the user to purchase a separate piece of PC hardware if the user desires to input Chinese language characters. Alternatively, some users may purchase specialized software that allows the selection of Chinese characters from a display on the computer device. Both the use of a separate PC hardware device and specialized software requires a great investment in capital, making them both unattractive to a normal every day user of a computer device.

Even with standard computer devices (e.g., home PCs or laptops), the standard keyboards provided do not completely support on-line Chinese character input, which is among the more difficult languages to input because of the use of hundreds of different characters (or associated strokes) in the Chinese language.

One conventional method provided to enable use of standard computer equipment to enter Chinese characters requires the computer user (or owner) to purchase a separate software program that has a special input device, which is available at a relatively high price. Also, there are a few other input methods that require special input devices to record the strokes associated with the software packages. However, these software packages and input devices are generally very expensive for common computer users, and thus most users are unable or unwilling to buy these expensive packages in order to access the functionality of inputting the Chinese characters, particularly when the convenience of this functionality is simply for causal and/or infrequent use.

In addition to the high costs, the conventional methods provide an input speed that is much slower than the special input techniques available, such as for Pinyin (simplified/traditional Chinese). Still some other techniques require the user to memorize a substantial amount of code to be able to program simply character inputs. Also, in addition to the cost and slow input speeds, another problem with finding a solution to this problem is that the Chinese people speak many different dialects and thus, a vast majority of Chinese people are not able to handle Pinyin very well and would not be comfortable (or efficient) using this input method.

Thus, without incurring the high costs of specialized software and/or special input devices for their computer, the average computer users is unable to input Chinese language characters on a desktop or laptop computer system.

As noted above, in addition to the high proliferation of computing devices, and even higher proliferation exists with mobile phones and personal devices, such as PDAs. Many people are willing to spend the money required to purchase a new cell phone, given the phones portability and the quick access to voice, data, text and other communication methods the phone provides. Many people with computer devices at home also own a cell phone or other portable electronic device with which they communicate while mobile.

Traditionally, most of these portable devices are designed with a standard keypad with basic text and numeric character input buttons. One technology offering with some portable devices, which was initially made popular by personal digital assistants (PDAs), such as Palm®, is that of touch screen input devices. With touch screen input devices, a user is able to utilize his fingers, a stylus or other pointed instrument to enter textual input and making selections of options/features that are displayed on the device's visual display. The entered information is then recognized as text or other input (selection), as would a normal input via a keypad or keyboard. In some instances, the characters of the keypad/keyboard are provided as a virtual keypad/keyboard within the touch screen display and the characters may then be selected suing the selection mechanism (finger, stylus, etc.).

Touch screen/touch pad technology has been incorporated into several cell phones designs, most recently in the iPhone®, a product of Apple Computers. Users of these types of cell phones (or other portable devices enabled with touch screen input) typically make selections and compose text on their cell phones using the touch screen.

The proliferation of cell-phone usage across the world, including in China, for example, has made handwriting recognition attractive again, due to the limited keypad of the cell phone and very popular usage of short messaging. PDA-phones with touch screens and Cell-phones with finger writing capabilities are becoming commonplace with Chinese business users. Such technology provides users with a continuity of experience across devices that utilize/support finger-writing technology. Three other advantages are provided by the finger writing technology over solutions that use dedicated interfaces attached to each user device. First, finger writing technology allows user mobility, while providing input that is not tethered to a recipient device, such as usage with a television. Second, finger writing technology enables multiple users to provide concurrent input to the same device, such as with multi-user editing or querying applications for a common device like a television. Third, the mobile device (e.g., cell phone) is essentially an intelligent and personal device that has rich context information. The availability of this rich context information can be leveraged to further enhance the user experience when using this capability with other devices that do not have the same capabilities. (e.g., text completion or predictive texting).

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
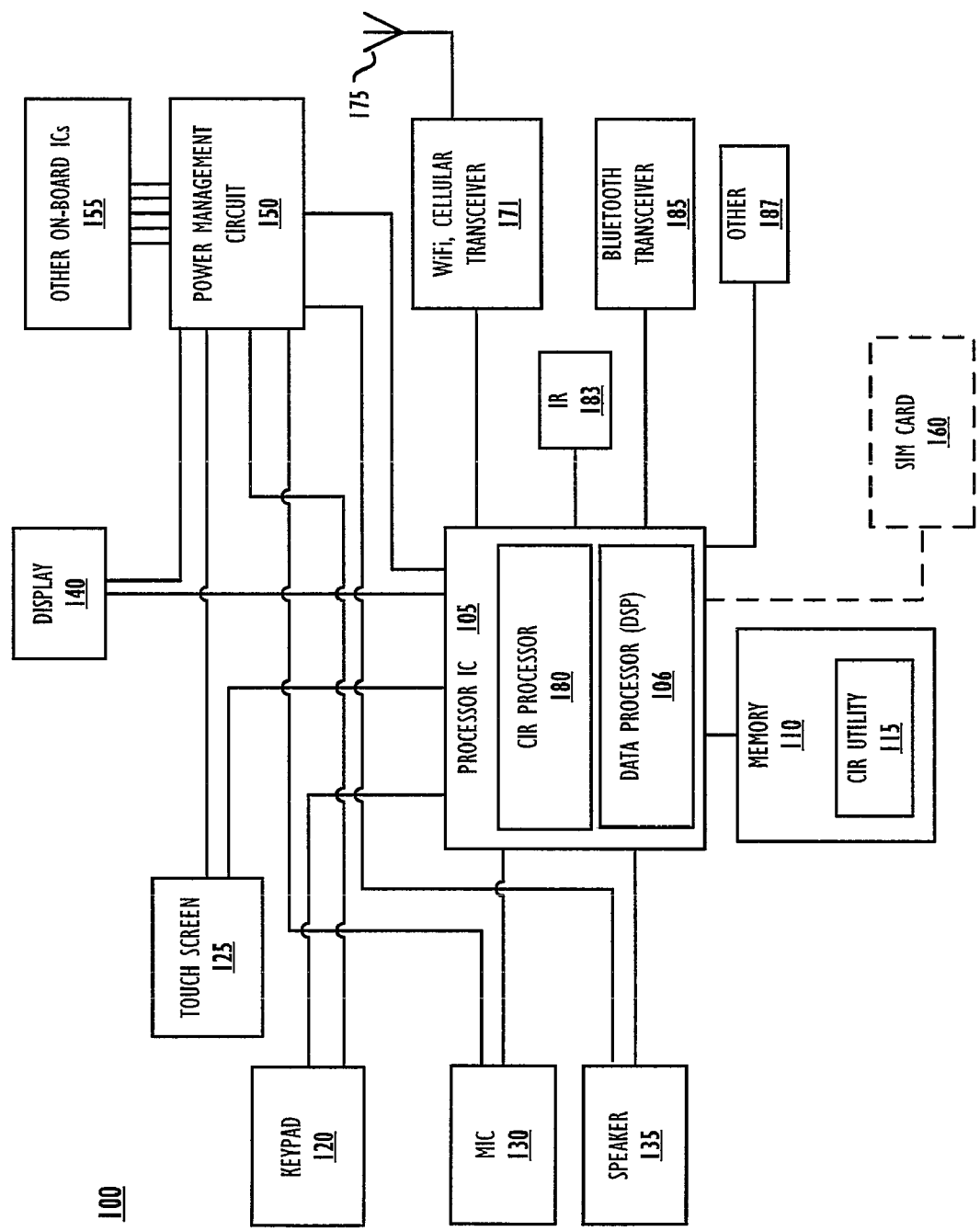
FIG. 1 is a block diagram illustrating an example mobile device, which includes components for enabling character input via a touch screen or other input device, in accordance with embodiments of the invention.

According to the illustrative embodiments, a system is provided to enable utilization of a portable electronic communication device as a peripheral input device for providing character inputs to a second electronic device. The first portable electronic communication device is utilized for standard voice and data communication over a first wireless communication interface. The first device has: a processing component; a touch screen input mechanism for receiving character inputs; and a mode switching utility that switches the first device between a first standard communication mode and a second peripheral input device mode. When the first device is in the second peripheral input device mode, the first device operates as a peripheral input device for the second device.

Additionally, the first device has a first wireless transmitter that enables the first device to communicate standard voice and data communication using a first communication protocol, when the device is in standard communication mode. The first device also has a second communication transmitter that transits signals of character inputs to the remote second device when the first device is in peripheral device mode. Notably, in one embodiment, both communication may be via the same transmitter with the device operating in a different manner depending on the mode the device is currently in.

The first device also includes a character input recognition utility, which, when the device is in the peripheral device mode, executes on the processing component to provide the functions of: detecting an input on the touch screen input mechanism; generating an electronic representation of the input; establishing a communication link between the second communication transmitter and an identified second device; and forwarding the electronic representation of the character input to the communication transmitter for transmission to the identified second device.

Additionally, according to exemplary embodiments, a cell phone with special input methods is utilized as an intelligent peripheral for a computer system. As an example, a finger-writing phone is utilized as a personal computer (PC) peripheral, which enables Chinese language character input on the phone, which is then forwarded to the PC or laptop.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

In particular, although the illustrative embodiments are described below with respect to an electronic device, which is specifically illustrated as a mobile (or cellular) phone, it will be appreciated that the present invention can be applied to other devices such as MP3 players, personal multimedia players (such as an IPod®), PDAs (Personal Digital Assistants), iPhones®, a Blackberry, a smart phone, a portable phone, a portable GPS (global positioning system) device, and similar portable devices designed with input mechanisms (supporting touch screen or other character input) for receiving and processing inputs of characters of different languages, including languages with non-standard characters. These devices generally have a primary function as well as a mechanism for inputting characters to enable the device to operate as a peripheral device for character input Application of the invention is therefore not limited to mobile phones.

Also, while described as enabling input via a touch screen input device, the features of the invention are equally applicable to other character input and/or selection mechanisms by which a character may be entered by direct input on a keypad/keyboard or selected from among displayed characters (virtual keyboard) on the mobile device. The functionality of most significance in such implementations is that of establishing a communication link with a second device and forwarding the entered character input to the second device.

Also, it is understood that the use of specific terminology and/or nomenclature are for example only and not meant to imply any limitations on the invention. The invention may thus be implemented with different nomenclature/terminology utilized to describe the various parameters/components/devices/utilities, without limitation. For example, the embodiments are generally described from the perspective of enabling "character inputs", which is utilized to generally refer to any textual, numeric, graphical, or other input form that may represent a character in any language and/or code recognized by the recognition utility executing in the background.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG.

2). The specific numerals assigned to the elements are provided solely to aid in the description and not meant to imply any limitations (structural or functional) on the invention.

With reference now to the figures, FIG. 1 is a block diagram representation of an example portable electronic device (first electronic device), which is designed with the functional components (hardware and software/firmware) required to enable the device to operate as a remote character input device. That, is portable electronic device 100 enables (a) character input via touch screen input and (b) subsequent transmission of the character input to a second electronic device via wireless (or wired) transmission.

As illustrated by FIG. 1, portable electronic device 100 comprises processor integrated circuit (IC) 105, which is connected to memory 110. Processor IC 105 may include a programmable microprocessor (data processor 106), which may include a digital signal processor (DSP) that controls the communication and other functions/operations of portable electronic device 100. These functions/operations include, but are not limited to, data processing and signal processing. Additionally, the functions/operations of data processor 106 include the execution of certain applications, utility or program code, which enable functional features of the device, such as (a) receipt and recognition of character inputs, (2) providing support for establishing a wireless transmission link with a second device, and (3) transmitting character inputs via the wireless transmission link to the second device. In one embodiment, the data processor 106 also performs the (DSP) functions of processing general voice and/or data communication.

Processor IC 105 also comprises character input recognition (CIR) processor 180, which may be a separate hardware component or a software utility executing on the data processor 106 that provides the character input recognition function of the described embodiments. In one embodiment, CIR processor 180 is operatively coupled to touch screen input device 125 (hereinafter touch screen 125) of electronic device 100 to support automatic character recognition for character inputs on touch screen 125. It is appreciated that the functionality of CIR processor 180 may be provided as software code executing within one or more of the illustrated components to which CIR processor 180 is shown operationally connected. The specific illustration of the CIR processor 180 is thus not meant to imply any structural, functional or other limitations with the invention.

Processor IC 105 is coupled to power management circuit 150, which controls the allocation of electrical power to the various components of portable electronic device 100. Processor IC 105 receives electrical power via power management circuit 150, which couples to a power source, such as a battery or a charging circuit (not shown). Power management circuit 150 also provides electrical power to the various input, output and functional devices, described below, as well as other on-board ICs 155.

Portable electronic device 100 also comprises input devices, of which keypad 120, touch screen (or touch pad) 125 and microphone (mic) 130 are illustrated, connected to processor IC 105 and power management circuit 150. For simplicity of describing the invention, both "touch screen" and "touch pad", as well as the phrase "finger input device" are utilized interchangeably and may generally be referenced as "touch input mechanism." Additionally, portable electronic device 100 comprises output devices, which are each connected to processor IC 105 and to power management circuit 150. Specifically, portable electronic device 100 in FIG. 1 comprises speaker 135 and display 140. In one embodiment, the electronic device includes a single touch screen display, which serves a dual purpose as an output device and a character input device. Thus, in this alternate embodiment, touch screen 125 may be integrated within display 140.

The various input and output devices allow for user interfacing with portable electronic device 100. In addition to the above components, portable electronic device 100 may also include other components utilized to enable standard voice or other form of data communication from/to portable electronic device 100. Among these components is wireless fidelity (WiFi) cellular transceiver 171, which is connected to antenna 175 to enable communication of radio frequency (RF) signals from and to portable electronic device 100. When portable electronic device 100 is a cellular phone, some of the received RF signals may be converted into audio signal (and vice versa), during voice communication. Also, several other data communication components are provided within portable electronic devices to enable transmission of character inputs, as described below. Among these components are infrared (IR) transceiver 183, Bluetooth transceiver 185, and wired communication module 187, which may be a universal serial bus that links the two devices via a USB or other serial cable. As described below, one or more these wireless (or wired) communication components supports the transmission of character inputs (entered on touch screen 125) from first device 100 to a second device, via a respective communication protocol.

Portable electronic device 100 may be a global system for mobile communication (GSM) mobile phone and thus includes a Subscriber Identity Module (SIM) card 160, which connects to processor IC 105 via a SIM adapter/port (not shown). SIM card 160 may be utilized as a storage device for storing data that is eventually utilized to enable character recognition of character inputs at the touch screen 125. The data may also be stored within memory 110. Among the data that may be stored is a dictionary or created list of known characters that serve as examples against which entered characters may be evaluated during character recognition.

In addition to the above hardware components, several functions of portable electronic device 100 and specific features of the invention may be provided as functional code/utility that is stored within memory 110 and executed by microprocessor 106 (or CIR processor 180) on processor IC 105. The microprocessor executes various functional code/firmware (e.g., character input recognition (CIR) utility 115) to provide processor-level control for (a) receiving character inputs from an input device (specifically touch screen 125) of portable electronic device 100 and (b) performing recognition of the character input, and (c) transmitting the character input to a remote device via an established communication link. Alternatively, CIR utility 115 may include therein code for implementing the functionality of CIR processor 180, when CIR processor 180 is a software construct.

Notably, according to the described embodiments, first device 100 also includes a mode switching utility 117 that switches the first device 100 between a first standard communication mode (of operation) and a second peripheral input device mode. When the first device 100 is in the second peripheral input device mode, the first device 100 operates as a peripheral input device for a second device, as is described in greater detail below. In one embodiment, the "switch" to the peripheral device mode does not turn off the other standard functions of the first device 100, but merely enables the first device 100 to concurrently operate as a peripheral input device as well.

Figure 2:
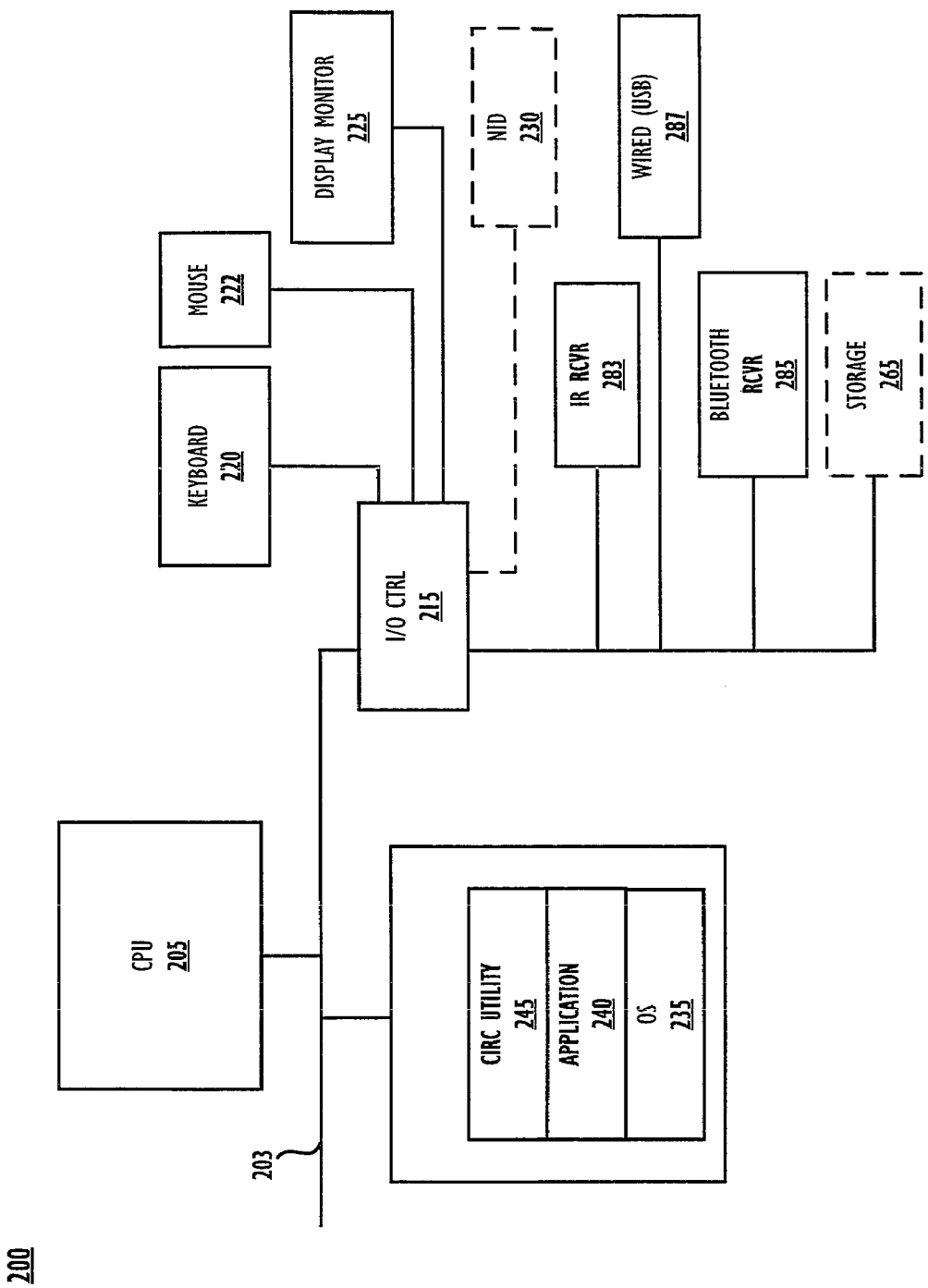
FIG. 2 is a block diagram illustrating an example computing device, which includes components for receiving character inputs from a mobile device, in accordance with one embodiment of the invention.

Turning now to FIG. 2, there is illustrated an example data processing system, which represents the second electronic device in the character input system, according to one embodiment. Data processing system (DPS) 200 comprises a central processing unit (CPU) 205 coupled to a memory 210 via a system bus/interconnect 203. Also coupled to system bus 203 is an input/output controller (I/O Controller) 215, which controls access by several input devices, of which keyboard 220 and mouse 222 are illustrated. I/O Controller 215 also controls access to output devices, of which display (monitor) 225 and other storage 265 (also an input device) are illustrated. I/O Controller 215 may further support connection to compact disk Read/Write (CDRW)/digital video disk (DVD) drives (not shown), to enable use of removable storage media.

The invention provides a user with a seamless input method across multiple input devices. The invention also enhances the user experience for text input, particularly when handwriting or finger-writing recognition is involved, since the user is able to move around the home or office while inputting text to their PC from their mobile device. The user can easily complete textual input to an end device when the user chooses to utilize the touch pad or touch-screen of the mobile device the user utilizes most frequently. Additionally, the various embodiments described herein enables achievement of very high accuracy when inputting complex characters, such as the Chinese language characters.

DPS 200 further comprises network interface device (NID) 230 by which DPS 200 is able to connect to and communicate with an external device or network (such as the Internet). NID 230 may be a modem or network adapter and may also be a wireless transceiver device. DPS 200 is further equipped with wireless receivers, of which IR receiver 283 and BT receiver 285 are illustrated. DPS 200 is also equipped with a wired receiver module 287, such as a universal serial bus (USB) ports. USB) port enables wired connectivity to other devices, such as portable electronic device 100 (FIG. 1) via a serial (or USB) cable. Each receiver enables DPS 200 to receive a transmission of a character input signal from a first device, such as portable electronic device 100 (FIG. 1), whereby portable electronic device 100 operates as a remote input device to DPS 200.

DPS 100 enables completion of various features of the invention by executing, on CPU 205, software code stored within memory 210 or other storage 265. Among the software code are code for operating system (OS) 235, code for applications 240 that may require character inputs, and more specific to the invention, code for establishing a communication link with a peripheral device using one of the above receivers (and corresponding protocol), code for receiving and processing character input from the connected first device, and code for enabling the other "PC-side" features described herein with reference to FIGS. 3-8. For simplicity, the collective body of code that enables the inventive features is referred to herein as character input recognition and confirmation (CIRC) utility 245. In actual implementation, the CIRC utility 245 may be added to existing operating system (OS) code to provide the inventive functionality of the second/receiving device.

Those of ordinary skill in the art will appreciate that the hardware depicted in FIGS. 1 and 2 may vary, depending on implementation. Other internal hardware or peripheral devices may be used in addition to or in place of the hardware depicted in FIGS. 1 and 2. Also, the processes of the present invention may be applied to other portable/handheld electronic device or data processing system or similar device with wireless transceiver functionality. Thus, the depicted example is not meant to imply architectural limitations with respect to the present invention.

Figure 3:
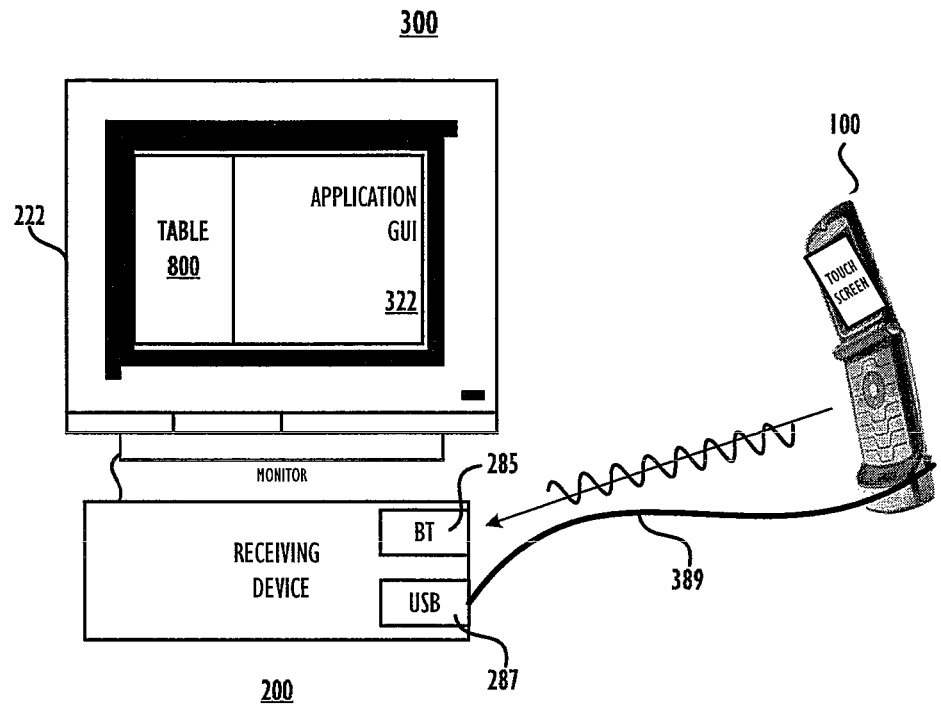
FIG. 3 illustrates a communication link between a mobile device, operating as a character input device, and a computing device executing an application requiring the character inputs, in accordance with one embodiment of the invention.

FIG. 3 illustrates a system 300 in which a portable electronic device 100 (specifically a mobile phone) communicates character inputs (received at the touch screen of the portable electronic device 100) to a second, receiving device (DPS 200) via wireless (Bluetooth) transmission or wired, serial link 289, for example. As shown, second, receiving device (200) DPS comprises BT receiver 285 and display monitor 225 on which a graphical user interface 322 of an executing application is provided.

According to the described embodiments, the link established between the first device (100) and second device (200) is a wireless (or wired) data communication channel utilized for transfer of character input data from the first device to the second device. When the data communication channel is wireless, the link may be implemented utilizing a wireless communication protocol, such as Bluetooth, WiFi or cellular (e.g., 2.5G, 3G, 4G). The link may be a direct link from one device to another, such as Bluetooth, ultra wideband (UWB), and millimeter wave (MMW), and/or the link may include one or multiple control elements such as an access point, a network router, a server, and a base station, etc, in the case of wireless fidelity (WiFi), WiMax, satellite, and cellular communication links, etc. For purposes of illustration only, and not by limitation, the described embodiments generally illustrate and/or describe Bluetooth (BT) wireless transmission, as the implementation example.

Figure 9:
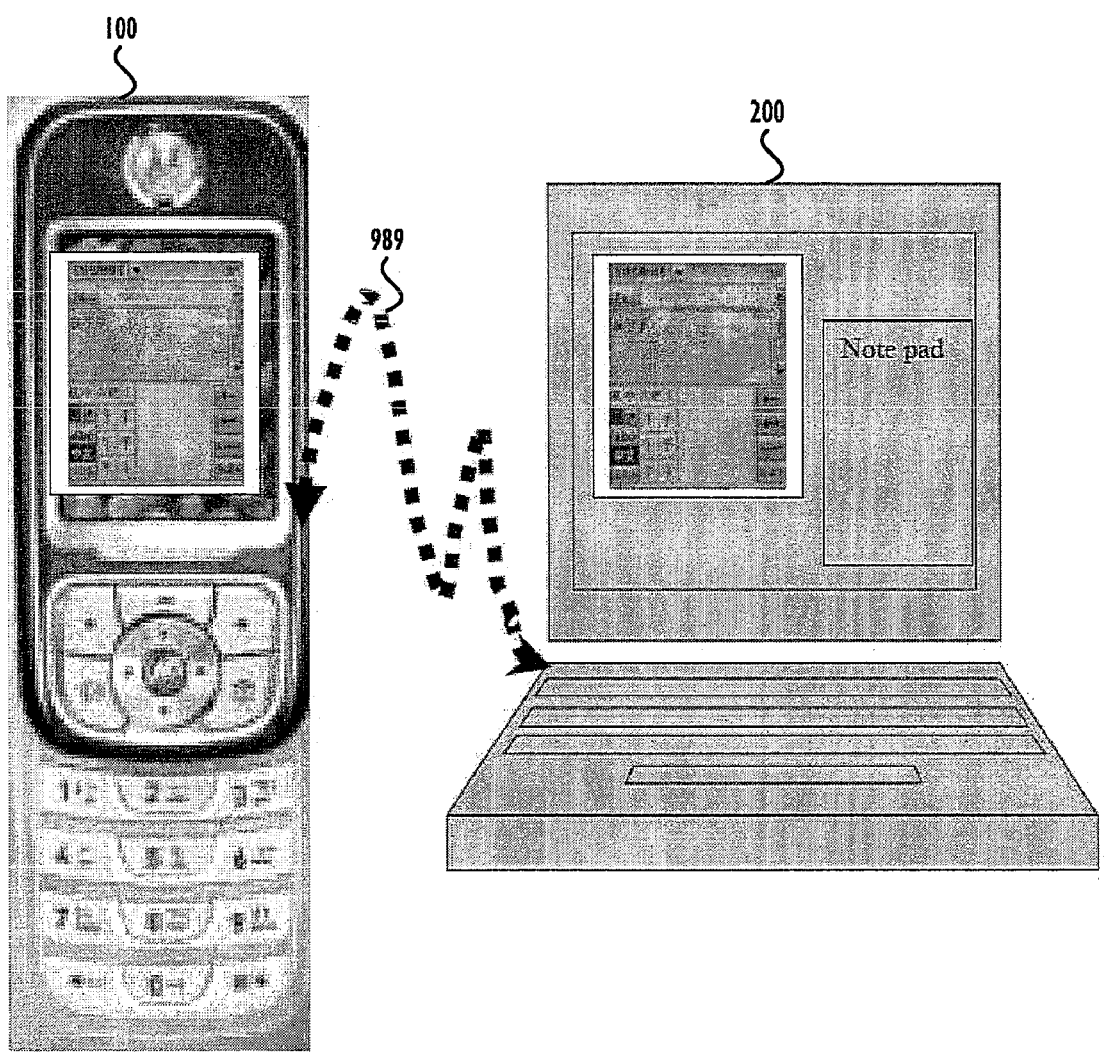
FIG. 9 illustrates example graphical user interfaces (GUIs) provided by the CIR and CIRC utilities respectively executing on the mobile device and the computer device and utilized to enable selection of a correct character input, in accordance with one embodiment of the invention.

In a more specific embodiment, FIG. 9 illustrates two example graphical user interfaces (GUIs) provided by the CIRC and CIR utilities respectively executing on the mobile device 100 and the computer device 200 and utilized to enable selection of a correct Chinese character input. As shown, both GUIs may provide similar features and options for the user to select the correct character input which is then inserted into the GUI of the executing application, as provided herein. The devices are illustrated connected via a connection/link 989, which may be wired or wireless. In one embodiment, only one of the two devices provides the representative GUI, enabling a single point of user selection of correct character inputs.

Figure 4:
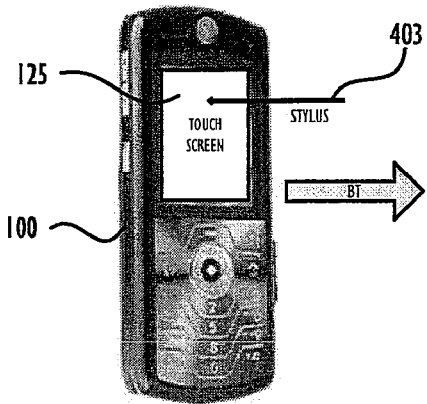
FIG. 4 is a schematic diagram illustrating the sub-components involved in the use of mobile device as a character input device for a computing device, in accordance with one embodiment of the invention.
Figure 4:
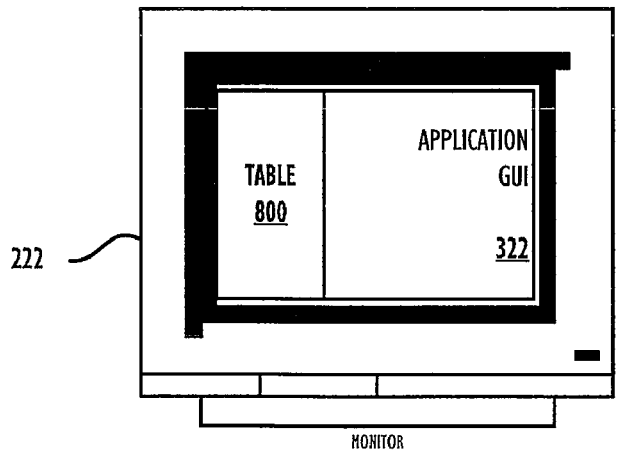

Turning now to FIG. 4, there is illustrated a sequence diagram illustrating the three main functions provided by the system of FIG. 3. In step 1 401, a portable electronic device 100 with a touch screen 125 receives character inputs via a stylus 403. In alternate embodiments, the character inputs may be inputted by the user using a finger or other tool.

When a user of the portable electronic device 100 desires to utilize device 100 to enter and transmit character inputs to a second, receiving device 200, the user first activates the CIR utility (function) via a software or hardware activation trigger (not specifically shown). In one embodiment, activation involves accessing the CIR feature via one of the available menu options of electronic device 100, where a function for enabling CIR entry and transmission is provided as a selectable option within the menu offerings. In another embodiment, electronic device 100 is designed with a CIR function button, within the keypad or provided as a physical affordance on the external body of device 100. Alternatively, the electronic device may be provided the software functionality to set up a CIR activation button by defining an existing button (on the keypad, for example) to automatically activate that feature when the button is depressed.

In the above described embodiments, once activation is initiated, mode switching utility 117 executes to enable portable electronic device 100 to function as a peripheral input device. Mode switching utility 117 and/or CIR utility 115 may operate in concert to establish the communication link with the second device to which the character inputs are to be forwarded. Both utilities may be provided as a single component, in which case they are collectively referred to as CIR utility 115.

Activation involves several functions, including: (a) triggering execution of the CIR utility on the processor, (b) establishing a wireless transmission link with the second device (200) using an available wireless transmitter and associated protocol, and (c) setting up the touch screen input device for receipt of character inputs. Establishing the wireless transmission link may involve providing selections of the available wireless transmission options for user selection and/or presetting a particular wireless transmitter and protocol (e.g., BT) for character input transmission.

Returning to FIG. 4, the character inputs are identified and forwarded via wireless connection (Bluetooth) to the receiving device. In step 2 405, the identified character inputs are transmitted over wireless connection. In one embodiment, device 100 may be connected via serial cable (389) to receiving device 200, and the character inputs (from the portable electronic device 100) are sent to the receiving device as a wired transmission (see FIG. 3). At step 3 407, the character inputs are displayed in the CIRC table 800 and/or application interface 322 on the receiving device's monitor 225. The CIRC utility executing on the receiving device (200) displays the characters with a matching selection in CIRC table 800 (described in greater detail below). The user may then select the correct character to be inputted into the executing application.

Figure 5:
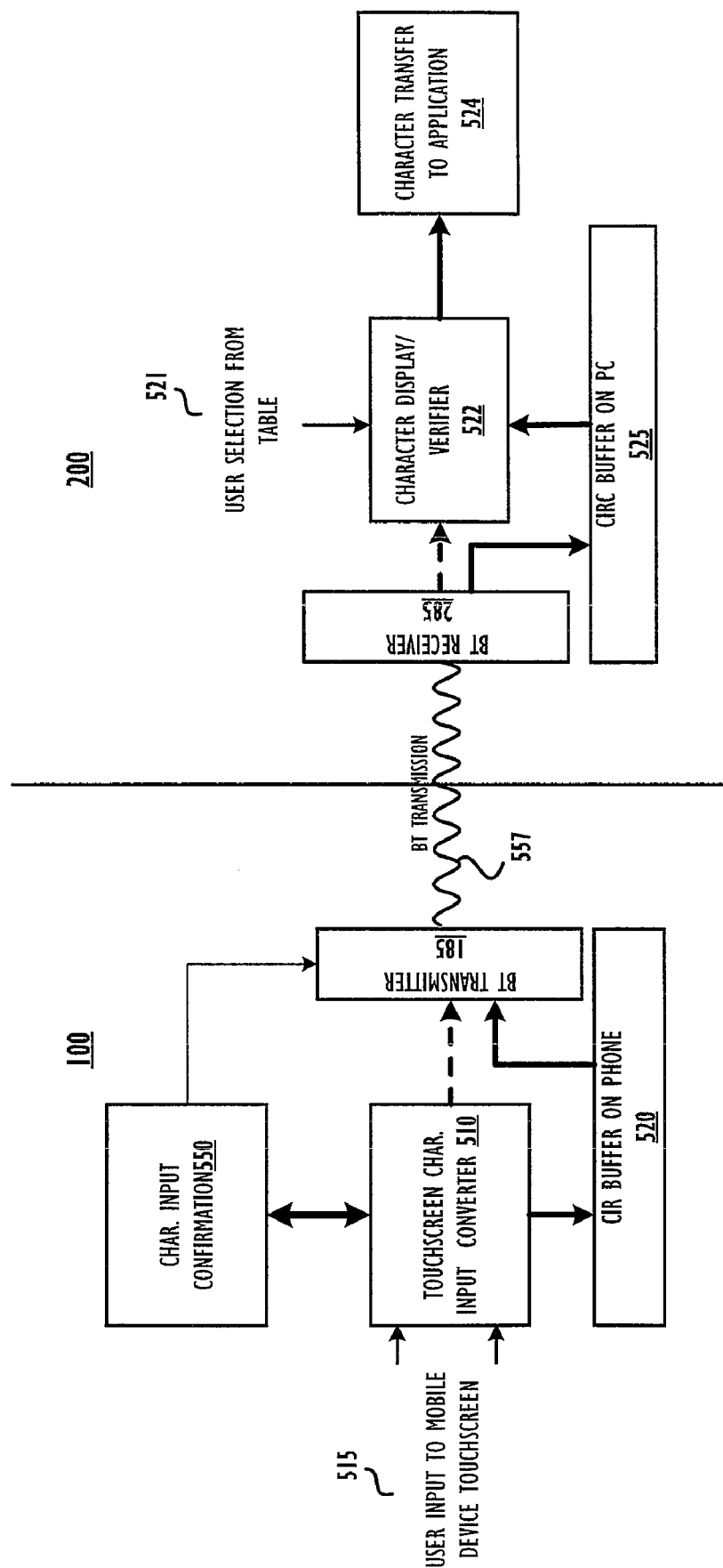
FIG. 5 is a sequence flow of operations involved in the use of a mobile device as a character input peripheral for a computing device, according to embodiments of the invention.

FIG. 5 provides a sequence view of the components and functions on both the first device-side (phone-side) and second device-side (PC-side) of the system during input, recognition transfers, receipt and processing of character inputs between the first and second devices in system 300. On the first device side 100' of the transmission, user input 515 is provided to the mobile device's touch input mechanism (e.g., touch screen/touch pad). CIR converter 510 of CIR utility on device 100 converts the touch screen input into a character. In the illustrative embodiment, character input confirmation 550 is provided by converter 510, which provides an electronic representation of the entry for confirmation by the user, in one embodiment. The CIR utility then forwards the character input(s) to a CIR buffer 520, which stores the list for transmission to the second device. In a first implementation, the buffer 520 is a real time, volatile buffer, which temporarily holds the contents as the contents are being transmitted over the established communication link. In a second implementation, the buffer may be a non-volatile buffer and may hold the characters within the first device 100 until the user later establishes the communication link and transmits the character inputs to the second device. The generated (list of) characters are then sent from CIR buffer 520 to Bluetooth transmitter 185, which transmits the characters via BT transmission 557.

Figure 10:
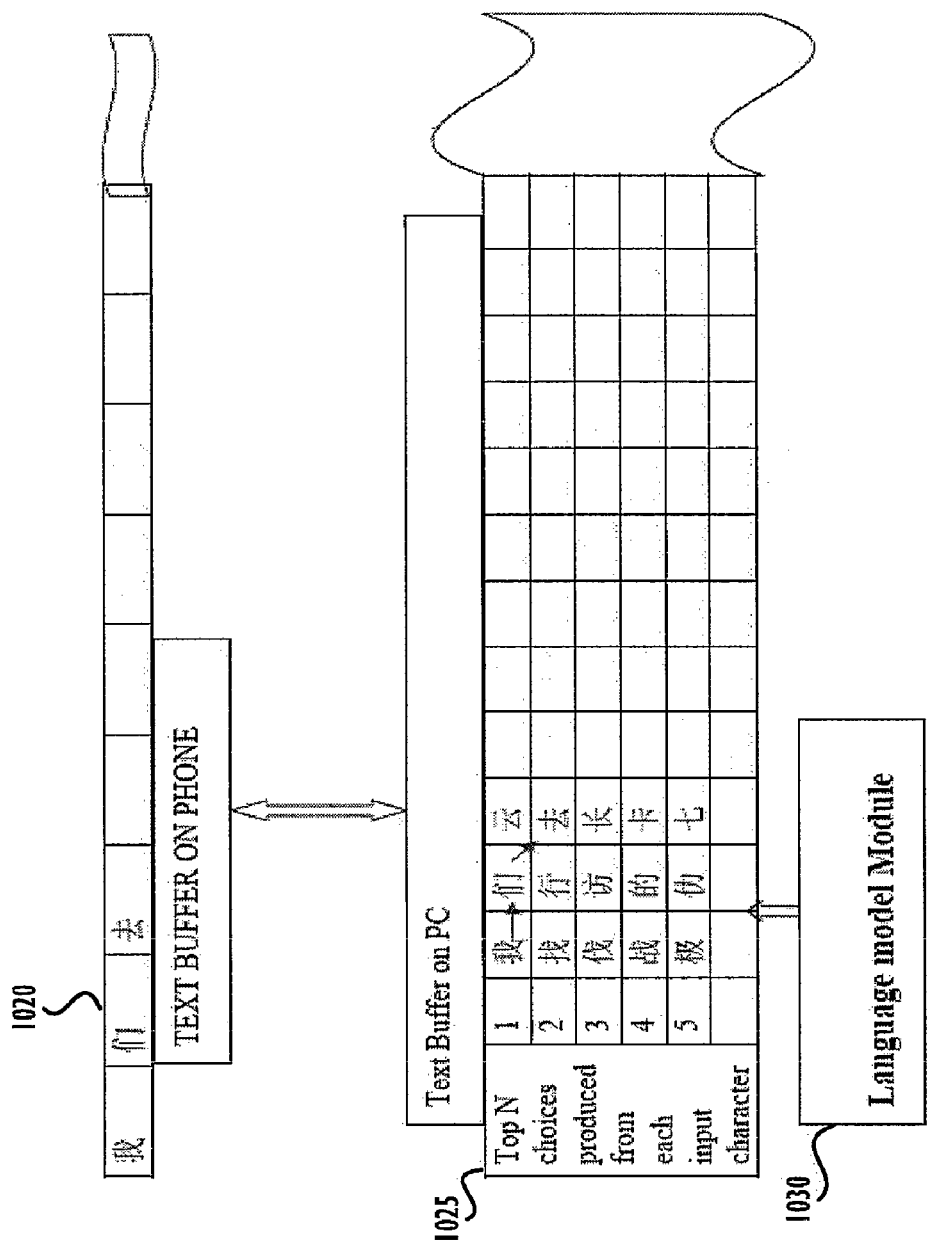
FIG. 10 illustrates two example buffers with Chinese input characters for selection by a user to insert into an executing application, according to one exemplary embodiment of the invention.

FIG. 10 illustrates an example CIR buffer 1020 and CIRC buffer 1025 with Chinese input characters, on the first device (100) and the second device (200), respectively. CIRC buffer 1025 enable user selection of a correct character input to provide to and execute an application, according to one exemplary embodiment of the invention. Also illustrated in FIG. 10, is a language model module 1030 which provides the language character matching features of the utility.

On the second device side (PC-side) 200' of the transmission, the BT transmission 557 is received by BT receiver 285 of second device 200. The PC side receives the character inputs and stores the (list of) characters in a CIRC buffer 525 on the second device-side. The received character inputs are forwarded to the character display verifier 522, which outputs a first choice of possible/probable character candidates, displayed along with a table of other possible character selections. User input 521 is provided to select the particular one of the characters from within the table that is the entered character input. The selected character is then placed in the application 524 executing on the second device 200.

The following Section A of the application describes in detail the implementation of CIR functions at the portable electronic device 100 that is utilized as a peripheral character input device. The associated processes are described and illustrated by FIG. 6. Section B and the descriptions of FIGS. 7 and 8 then describes the implementation of the CIRC functions at the second device (DPS 200) when a character input is received from the portable electronic device (100) operating as a peripheral input device.

A. Portable Electronic Device as Remote Character Input Device

Figure 6:
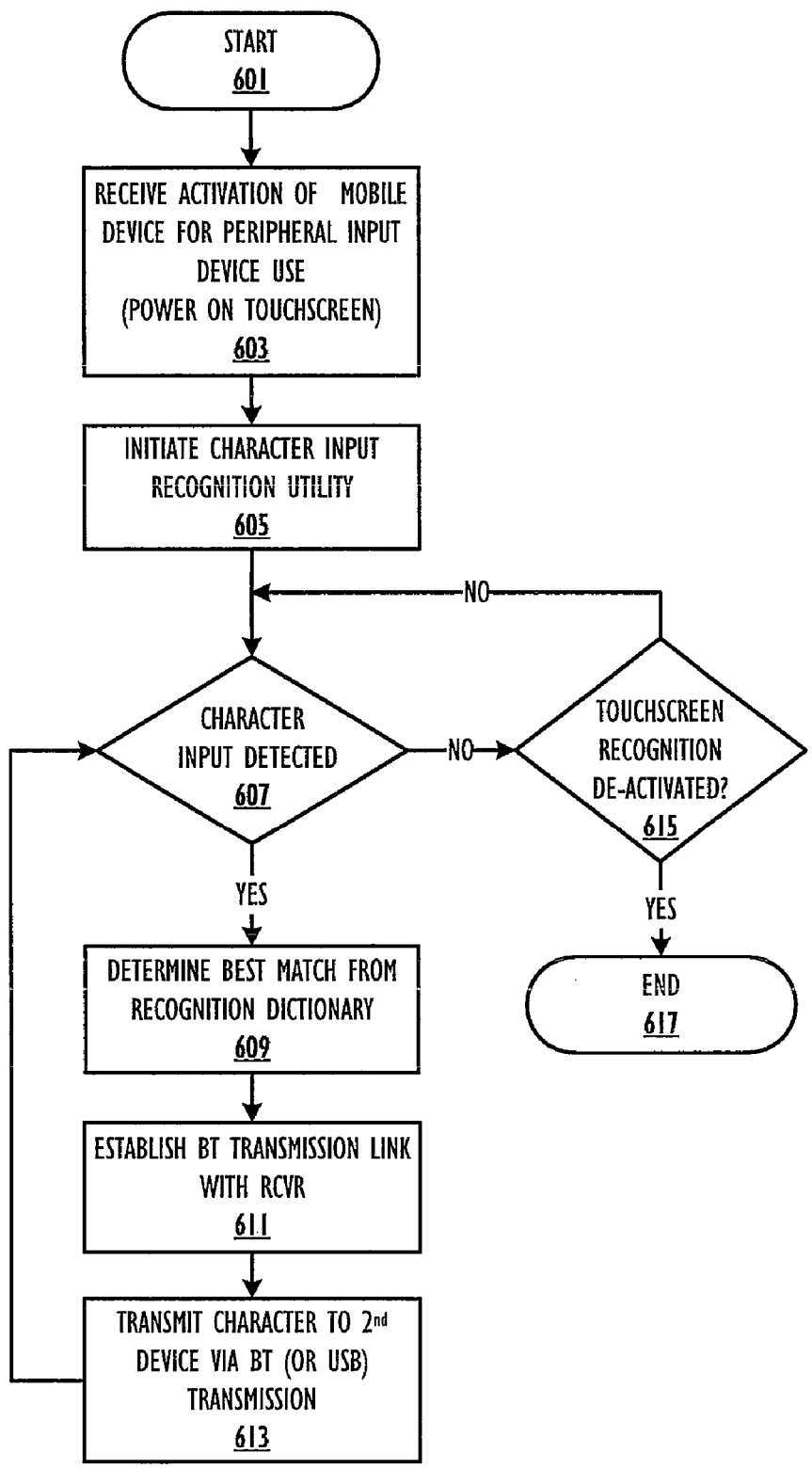
FIG. 6 is a flow chart of the method by which a mobile device is utilized as a character input device, according to one embodiment of the invention.

FIG. 6 illustrates the process by which the mobile phone is utilized as the input peripheral. The method steps are described from the perspective of CIR utility within device 100 being activated and subsequently executing to enable device 100 to operate as an input peripheral. The process begins at start block 601, and proceeds to block 603, at which activation is detected/received for usage of the device as a peripheral device. On receipt of the activation, the device initiates execution of the CIR utility, as shown at block 605 and also powers the touch screen of the device to enable character input detection. Activation may be triggered by user selection of an operational mode (from the menu of options), depressing a new peripheral mode affordance/button, or simply touching the touch screen, which is automatically placed in an input mode, or some other activation method pre-programmed into the device.

The CIR utility then monitors for detection of a character input, at decision block 607. The utility further monitors, at block 615, for a de-activation of touch screen recognition, which signals that the device is no longer being utilized as a peripheral device. If de-activation is detected, the process ends at termination block 617. When a character input is detected, as determined at block 607, the input is evaluated by CIR utility, which determines a best match of the character input from a recognition dictionary, as shown at block 609. The user writes a character on the touch screen of the phone and the writing is recognized as one of a list of character candidates stored on phone. The CIR utility stores the top choice within the phone's CIR buffer and may display the choice to the phone's user. A list of these character inputs is buffered at the phone device for transmission to the receiving PC.

At block 611 a Bluetooth link (or other wireless, or wired, link) is established with the receiving PC. Once the link is established, the list of buffered characters is transmitted to the PC via the USB (wired) or Bluetooth (wireless) connections, as shown at block 613. This process continues until the usage mode of the phone is switched back from peripheral device use to regular use.

In an alternate embodiment, the raw input data is transmitted from the phone to the PC, such that no recognition is performed at the phone. This embodiment may be a selectable option provided by the utility. However, given that each different type of phone may have different types of sensors of different sizes or resolutions or sensitivity, as well as a wide list of different sensor parameter settings, performing the recognition locally (on the first device) enables for more effective calibration of received character input at the particular phone. This also substantially reduces the requirement for a duplication of the recognition engine on the PC side, while ensuring relatively good performance.

B. Second Device Receipt, Confirmation, and Utilization of Character Input

Figure 7:
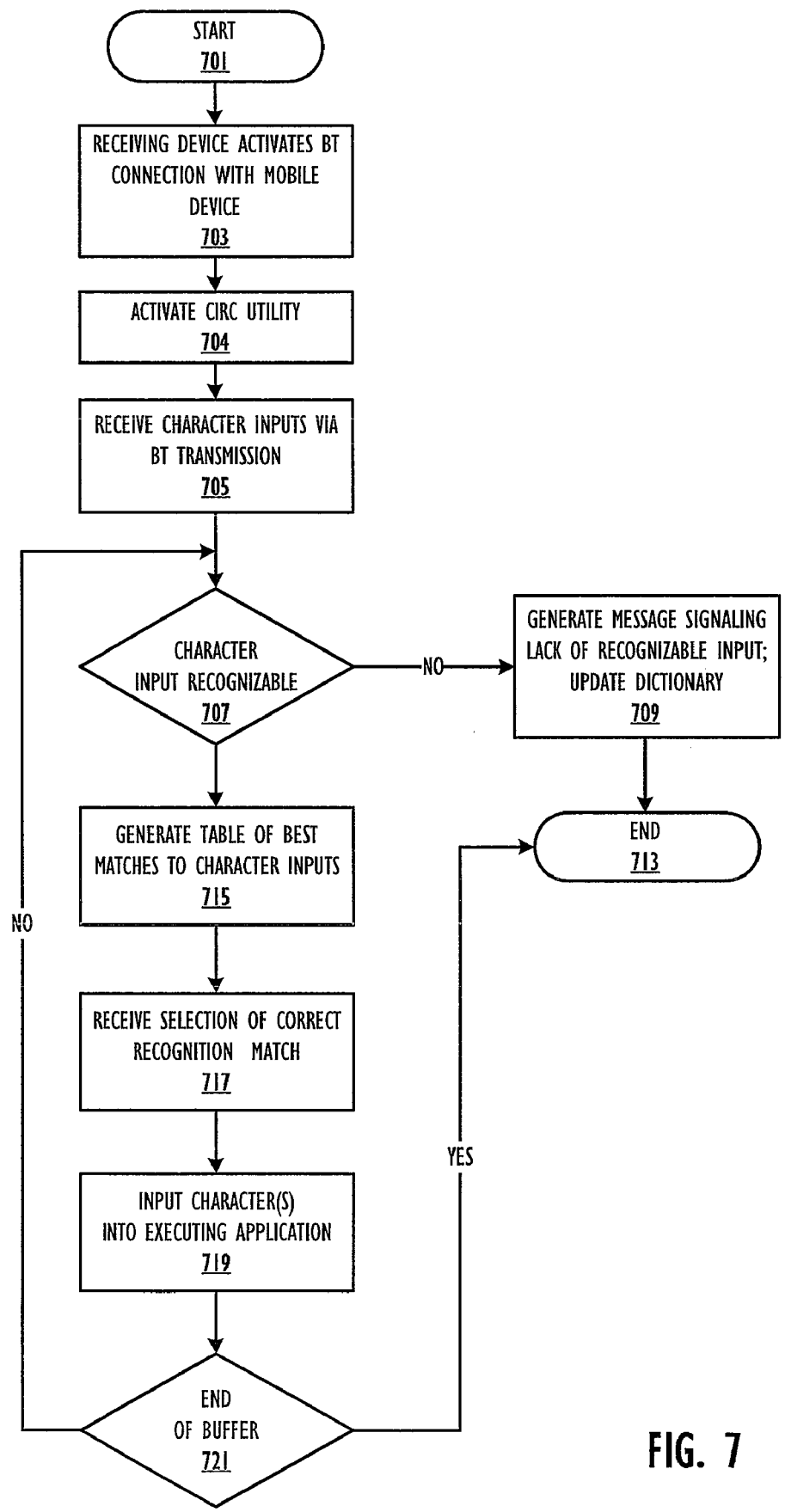
FIG. 7 is a flow diagram of the method by which the computing device receives and utilizes character inputs from a mobile device, in accordance with one embodiment of the invention.

FIG. 7 is a flow chart illustrating the processing that occurs at the second, receiving device (e.g., DPS 200), according to one embodiment. The process begins at start block 701, and proceeds to block 703 at which the DPS 200 receives an activation signal from the peripheral device. The activation may be in response to receipt of a request for BT pairing, in one embodiment. The activation triggers execution of the CIRC utility, as shown at block 704, and then the CIRC utility begins to accept/receive character inputs being transmitted from the peripheral device, as shown at block 705. In one embodiment, these character inputs are buffered in a character input buffer (525) of the CIRC utility.

At block 707, the utility evaluates the character input and determines if the received character input(s) is recognizable (or identifiable). When the recognition occurs at the mobile device, the character inputs should be recognizable and may be immediately entered into the application window; However, for embodiments in which the entered character inputs are simply forwarded to the DPS 200, input recognition occurs at the DPS 200, and some character inputs may not be recognizable. When the input is not recognizable, the utility generates and outputs a message indicating that the received input is not recognizable, as shown at block 709. Then the process ends at block 713. In one embodiment, the user may then update the character input recognition dictionary to account for a new character input, which may not have been previously included within the dictionary.

Figure 8:
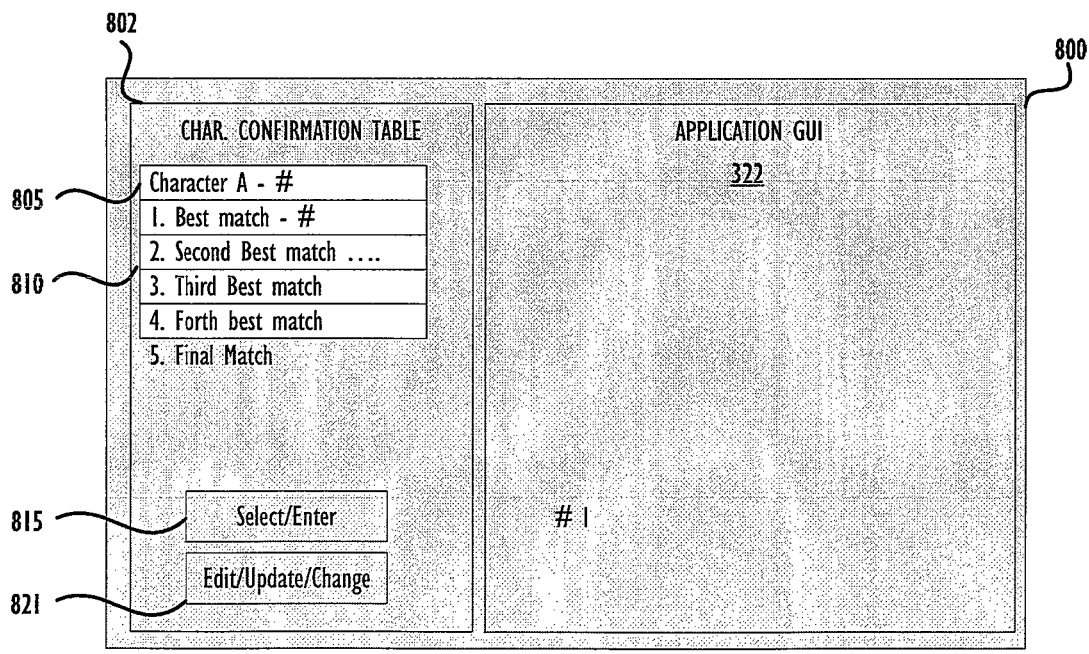
FIG. 8 is an example table of provided character matches for a received character input from which a selection of a correct match is made, in accordance with one embodiment of the invention.

When a recognizable character input is received, the utility generates a table of best matches for the character inputs, which table is outputted for user interface, as shown at block 715. An example table is illustrated by FIG. 8. As shown, table 802 includes a first row of received character inputs 805, each followed by subsequent rows of possible matches 810. A best match, as determined by the utility, presented first, and subsequent best matches presented in declining order. Only five possible matches 810 are provided by the example table 802, however, any number of matches may be presented in alternate embodiments. The user is then able to make a selection of which of the possible matches 810 accurately represents the original character input entered on the first device 100. Entry of the selection may be via select/enter button 815 within table 802

At block 717, the utility receives a selection of the correct match of the character input. In one embodiment, this selection is automatic and the best match is provided unless specifically changed by the user using an editing feature (821) of the utility. Once a correct match is made, the character is then inputted into the executing application in which the character input is intended to be entered, as shown at block 719. The features described in the illustrative embodiments further allow the user to copy the contents and paste the copied character(s) into the applications, which may be a Word Processing application, Graphical application, Spread Sheet, Database application, a Instant Messaging or Chat application, or any other type of application in which character inputs may be made.

A decision is then made at block 721 whether there are other character inputs in the receiving buffer. If no more character inputs are present in the buffer (or received from the first device 100), the process ends at block 713. Otherwise, the utility continues to received and evaluate the list of characters as described above.

In the flow charts described above, one or more of the methods may be embodied as computer readable code, such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

In the various functional application scenarios (i.e., the embodiments illustrated by the various figures), a system is established that enables remote character input to a second electronic device by a first portable electronic device, serving as a peripheral device for character input. The first and second devices are designed with the functional components to enable wireless or wired connectivity between the components for communication of the character inputs from the first device to the second device. A specialized utility executing at the first device and a second utility executing at the second device completes the respective functional processes at each device to enable operation of the system.

Accordingly, with the above phone-side and PC-side processes, the invention enables a user to move freely around the PC to input characters of any type when the devices are capable of wireless communication, as via Bluetooth, or wired communication, as via USB connection. The invention further enables application of a more sophisticated language model on the PC side. Specifically, the invention enables the application of a language model to character lattice to improve the hand-writing recognition accuracy. These improved results can be synchronized with the phone too.

As a final matter, it is important that while an illustrative embodiment of the present invention has been, and will continue to be, described in the context of a fully functional electronic device with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. As an example, in one embodiment, the software aspects of the invention are provided on a computer disk that is provided with the cell phone or other portable device, used as a first device, and the functionality of the CIR utility and/or the CIRC utility may be loaded unto the respective devices using a computer with USB cable connections or BT connections to the first device. Alternatively, the software may be downloaded from a service provider website or other online source or bought off-the shelf as a generic software offering (i.e., not proprietary and/or packaged with the first device).

While the invention has been particularly shown and described with reference to a preferred embodiment, it will be understood by those skilled in the art that various changes in form and detail may be made therein without departing from the spirit and scope of the invention.

What is claimed is:

1. A system for enabling utilization of a portable electronic communication device as a peripheral input device for providing character inputs to a second electronic device, said system comprising:

a first device that is a portable electronic communication device utilized for standard voice and data communication over a first wireless communication interface, said first device having:
- a processing component;
- a touch input mechanism for receiving character inputs;
- a mode switching utility that switches the first device between a first standard communication mode enabling standard voice and data communication and a second peripheral input device mode, wherein the first device operates as a peripheral input device for remote character input, including non-standard characters, to a second device separate from local character input to the first device when in the second peripheral input device mode and wherein the mode switching utility enables a concurrent use of the first device for voice and data communication while the first device is in the second peripheral input device mode;
- a character input recognition (CIR) utility, which, when the first device is in the peripheral input device mode, executes on the processing component to provide the functions of:
  - establishing a communication link between the first device and an identified second device; and
  - on detecting that the communication link is established, forwarding an electronic representation of one or more character inputs received at the touch input mechanism, including non-standard characters, to the identified second device via the communication link.

2. The system of claim 1, wherein said CIR utility further provides the functions of:
- receiving an input on the touch input mechanism;
- generating the electronic representation of the input;
- evaluating the input against a dictionary of known characters to determine a best match of the input as a character input;
- when one or more matches of the character input is found within the dictionary of known characters, forwarding the electronic representation of the best match of the input to the identified second device via the communication link; and
- when no match of the character input is found within the dictionary of known characters:
  - generating a message that the character input is not recognizable;
  - enabling an update to the character input recognition dictionary with a new character input; and
  - transmitting raw character input data received at the first device directly to the second device as the new character input.

3. The system of claim 1, wherein the first portable electronic communication device further comprises:
- a first wireless transmitter that enables the communication device to communicate the standard voice and data communication using at least a first communication protocol when the first device is in standard communication mode;
- a second communication transmitter that transits signals of character inputs to the identified second device via the communication link when the first device is in the second peripheral input device mode; and
- wherein, when the second communication transmitter is a Bluetooth (BT) transmitter, said establishing the communication link comprises activating a pairing of the BT transmitter with a BT receiver of the identified second device.

4. The system of claim 1, wherein said CIR utility further provides the functions of:
- buffering the one or more character inputs within a CIR buffer in the first device prior to forwarding the electronic representation of the character inputs via the communication link; and
- detecting when the communication link is later established with the second device; and
- transmitting buffered character inputs to the second device when the communication link is later established with the second device;
- wherein the one or more character inputs are transmitted from the first device to the identified second device via the communication link when the one or more character inputs are received at the first device, while the communication link is established.

5. The system of claim 1, wherein:
- said CIR utility further comprises a dictionary of known characters, wherein the dictionary of known characters is a dictionary of characters in a language that includes non-standard characters; and
- said CIR utility further provides the functions of:
  - accessing the dictionary of known characters;
  - comparing the character input against characters within the dictionary of known characters for a best match;
  - when one or more matches of the character input is found within the dictionary of known characters, identifying the best match from the dictionary for forwarding to the identified second device; and
  - when no match of the character input is found within the dictionary of known characters:
    - generating a message that the character input is not recognizable;
    - enabling an update to the dictionary with a new character input; and
    - transmitting raw character input data received at the first device directly to the second device.

6. The system of claim 1, wherein said CIR utility further comprising code for providing the functions of:
- generating a table of characters that are substantially similar to the one or more character inputs received;
- enabling user selection of a best match from the table of characters; and
- enabling copying of a character at the first device and pasting of the character into the one or more applications executing on the second device.

7. The system of claim 1, wherein the first device is a device having a primary communication function that enables the first device to operate as a voice/mobile communication device and a mechanism for inputting characters to enable the device to operate as a peripheral device for character input, said device being one or more of a cellular phone, a personal digital assistant, an iPhone®, a Blackberry, a smart phone, an IPod®, a portable media player, a portable phone, and a portable GPS (global positioning system) device.

8. The system of claim 1, wherein the identified second device comprises:
- a processor;
- a receiver device for establishing the communication link with the first device and receiving the one or more character inputs from the first device via the communication link;
- a character input recognition and confirmation/verification (CIRC) utility that executes on the processor of the identified second device to provide the functions of:
  - receiving the character input from the first device via the communication link;

generating a selection of one or more characters that are possible representations of the character inputs received from the first device;

for each character input received, enabling selection from the first device of a single character from among the one or more characters as a correct character for forwarding to an executing application; and automatically inserting the correct character into the executing application following selection of the correct character.

9. The system of claim 8, wherein the second device further comprises:

one or more applications executing on the processor and which provides a graphical interface within which received character inputs are displayed;

wherein said CIRC utility forwards the correct character to a presently active application among the one or more applications; and wherein the CIRC utility further enables:

receiving of raw character input data from the first device;

updating of a local dictionary at the second device with a new character input received from the first device; and copying of a character at the first device and pasting of the character into the one or more applications executing on the second device.

10. A portable electronic communication device (communication device) comprising:

a processing component;

a touch input mechanism for receiving character inputs;

a mode switching utility that switches the device between a first standard communication mode and a second peripheral input device mode, wherein: the communication device is utilized for standard voice and data communication over a first wireless communication interface when in the first standard communication mode; and the communication device operates as a peripheral input device for remote character input, including non-standard characters, to a second device separate from local character input to the first device when the communication device is in the second peripheral input device mode; and the communication device is configured to enable concurrent use for voice and data communication, while the communication device is in the second peripheral input device mode;

a character input recognition (CIR) utility, which, when the communication device is in the peripheral input device mode, executes on the processing component to provide the functions of:

establishing a communication link between the communication device and an identified second device; and forwarding an electronic representation of character inputs received at the touch input mechanism, including non-standard characters, to the identified second device via the communication link.

11. The device of claim 10, wherein said CIR utility executing on the processing component further provides the functions of:

receiving an input on the touch input mechanism;

generating the electronic representation of the input;

evaluating the input against a dictionary of known characters to determine a best match of the input as a character input;

generating a table of characters that are substantially similar to the received character input;

enabling user selection of the best match from within the table of characters;

when one or more matches of the character input is found within the dictionary of known characters, forwarding the electronic representation of the best match of the input to the identified second device via the communication link; and when no match of the character input is found within the dictionary of known characters:

generating a message that the character input is not recognizable;

enabling an update to the dictionary with a new character input; and transmitting raw character input data received at the communication device directly to the second device as the new character input.

12. The device of claim 10, further comprising:

a first wireless transmitter that enables the communication device to communicate the standard voice and data communication using a first communication protocol when the communication device is in standard communication mode;

a second communication transmitter that transits signals of character inputs to the identified second device via the communication link when the communication device is in peripheral input device mode; and wherein, when the second communication transmitter is a Bluetooth (BT) transmitter, said establishing the communication link comprises activating a pairing of the BT transmitter with a BT receiver of the identified second device.

13. The device of claim 10, wherein said CIR utility further provides the functions of:

buffering the one or more character inputs within a CIR buffer in the communication device prior to forwarding the electronic representation of the character inputs via the communication link;

detecting when the communication link is later established with the second device; and transmitting buffered character inputs to the second device when the communication link is later established with the second device;

wherein the one or more character inputs are transmitted from the first device to the identified second device via the communication link when the one or more character inputs are received at the first device, while the communication link is established.

14. The device of claim 10, wherein:

said CIR utility further comprises a dictionary of known characters, wherein the dictionary of known characters is a dictionary of characters in a language that includes non-standard characters; and said CIR utility further provides the functions of:

accessing the dictionary of known characters;

comparing the character input against characters within the dictionary of known characters for a best match;

when one or more matches of the character input is found within the dictionary of known characters, identifying the best match from the dictionary for forwarding to the identified second device; and when no match of the character input is found within the dictionary of known characters:

generating a message that the character input is not recognizable;

enabling an update to the dictionary with a new character input; and transmitting raw character input data received at the first device directly to the second device as the new character input.

15. The device of claim 10, wherein:
the communication device is one or more of a cellular phone, a personal digital assistant, an iPhone®, a Blackberry, a smart phone, an IPod®, a portable media player, a portable phone, and a portable GPS (global positioning system) device; and
said CIR utility further provides the functions of:
generating a table of characters that are substantially similar to the one or more character inputs received;
enabling user selection of a best match from the table of characters; and
enabling copying of a character at the first device and pasting of the character into the one or more applications executing on the second device.

16. A method for enabling use of a portable communication device as a peripheral input device for character input to a second device, said method comprising:
switching a mode of operation for the device from a first standard communication mode to a second peripheral input device mode, wherein:
the device is utilized for standard voice and data communication over a first wireless communication interface when in the first standard communication mode;
the device operates as a peripheral input device for a second device when in the second peripheral input device mode, and the device may be utilized concurrently for standard voice and data communication while in the second peripheral input device mode;
receiving an input on the touch input mechanism;
generating an electronic representation of the input;
evaluating the input against a dictionary of known characters to determine a best match of the input as a character input, wherein the dictionary of known characters is a dictionary of characters in a language that includes non-standard characters;
when one or more known characters that are similar to the input are found within the dictionary of known characters:
generating a table of characters that are substantially similar to the received character input;
enabling user selection of the best match from within the table of characters;
when no match of the input is found within the dictionary of known characters:
generating a message that the input is not recognizable; and
enabling an update to the dictionary with a new character input;
establishing a communication link between the device and an identified second device; and
forwarding an electronic representation of the input received at the touch input mechanism to the identified second device via the communication link, wherein said forwarding forwards to the second device via the communication link one of: (a) the electronic representation of the best match, when at least one match of the input is found within the dictionary of known characters; or (b) the electronic representation of raw character input data received at the first device when no match of the input is found within the dictionary of known characters.

17. A readable storage medium utilized within a portable communication device, wherein the storage medium comprises program code that when executed by a processor within the portable communication device provides the functions of claim 16.

18. A data processing system comprising:
a processor;
a receiver for receiving from a remote peripheral device, electronic inputs representing one or more character inputs entered at the remote peripheral device;
a character input recognition and confirmation/verification (CIRC) utility that executes on the processor to provide the functions of:
receiving the one or more character inputs from the remote peripheral device via a communication link;
when the one or more character inputs received are similar to one or more known characters within a dictionary of known characters:
generating a selection of one or more characters that are possible representations of the one or more character inputs that was received from the remote peripheral device;
enabling selection of a character for each of the one or more character inputs from among the one or more characters as a correct character for forwarding to an executing application; and
automatically inserting the correct character into the executing application following selection of the correct character; and
when no match of the one or more character inputs is found within the dictionary of known characters:
generating a message that one or more of the character inputs is not recognizable;
enabling an update to the dictionary with a new character input; and
inserting the new character input into the executing application.

19. The data processing system of claim 18, further comprising:
one or more applications executing on the processor and which provides a graphical interface within which received character inputs are displayed; and
wherein said CIRC utility further provides the functions of:
receiving of raw character input data from the first device;
updating of a local dictionary at the second device with a new character input received from the first device; and
copying of a character at the first device and pasting of the character into the one or more applications executing on the second device; and
forwarding a correct character to a presently active application among the one or more applications.

20. The data processing system of claim 18, wherein:
said CIRC utility further comprises a dictionary of known characters, wherein the dictionary of known characters is a dictionary of characters in a language that includes non-standard characters;
said CIRC utility further provides the functions of:
accessing the dictionary of known characters;
comparing the one or more character inputs against characters within the dictionary of known characters for a best match;
generating a table of characters that are substantially similar to the one or more character inputs received;
identifying the best match from the dictionary for forwarding to the executing application; and wherein said forwarding forwards the electronic representation of the best match to the executing application.

21. A method for receiving and processing character inputs from a remote peripheral device, said method comprising:
   receiving one or more character inputs from the remote peripheral device via a communication link;
   when the one or more character inputs received are similar to one or more known characters within a dictionary of known characters:
      generating a selection of one or more characters that are possible representations of the one or more character inputs received from the remote peripheral device;
      enabling selection of a character for each of the one or more character inputs from among the one or more characters as a correct character for forwarding to an executing application; and
      automatically inserting the correct character into the executing application following selection of the correct character;
   when no match of the one or more character inputs is found within the dictionary of known characters:
      generating a message that one or more of the character inputs is not recognizable;
      enabling an update to the dictionary with a new character input; and
      inserting the new character input into the executing application; and
   enabling copying of a character at the first device and pasting of the character into the one or more applications executing on the second device.

22. The method of claim 21, further comprising:
   accessing a dictionary of known characters, wherein the dictionary of known characters is a dictionary of characters in a language that includes non-standard characters;
   comparing the one or more character inputs against characters within the dictionary of known characters for a best match;
   generating a table of characters that are substantially similar to the one or more character inputs received;
   identifying the best match from the dictionary for forwarding to the executing application; and
   wherein said inserting automatically inserts the best match of the characters within the executing application when a correct character is not selected.

* * * * *